United States Patent
Brandon et al.

(10) Patent No.: US 6,366,729 B1
(45) Date of Patent: Apr. 2, 2002

(54) LIMITATION OF OSCILLATION CAUSED BY RAMAN AMPLIFICATION DUE TO THE USE OF DIFFERENT FIBERS

(75) Inventors: Eric Brandon, Bourg la Reine; Jean-Pierre Blondel, Buc; Patrice Le Roux, Montlhery; Denis Toullier, Fleury les Aubrais, all of (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/594,774

(22) Filed: Jun. 16, 2000

(30) Foreign Application Priority Data

Jul. 5, 1999 (FR) .............................. 99 08657

(51) Int. Cl.7 ................................. G02B 6/02
(52) U.S. Cl. ................. 385/123; 372/3; 372/6
(58) Field of Search .............................. 385/123; 372/3, 372/6, 703; 359/173

(56) References Cited

U.S. PATENT DOCUMENTS 5,673,280 A * 9/1997 Grubb et al. .................. 372/3

FOREIGN PATENT DOCUMENTS

EP 0 789 432 A1 8/1997

OTHER PUBLICATIONS

Hansen, P. B, et al.: "Rayleigh scattering limitations in distributed Raman pre-amplifiers" IEEE Photonics Technology Letters, Jan. 1998, IEEE, USA, vol. 10, No. 1, pp. 159–161, XP0002134578.

* cited by examiner

Primary Examiner—Cassandra Spyrou
Assistant Examiner—Euncha Cherry
(74) Attorney, Agent, or Firm—Sughrue Mion, PLLC

(57) ABSTRACT

In a fiber optic transmission system comprising line fiber and a pump for distributed amplification in the line fiber by stimulated Raman scattering, the line fiber comprises multiple sections and the nature of the fibers in each section and the length of each section are chosen so that the Raman gain is lower than the Rayleigh backscattering coefficient at all points of the system. This avoids the limitations that are experienced if the Raman gain is greater than the Rayleigh backscattering coefficient.

5 Claims, 1 Drawing Sheet

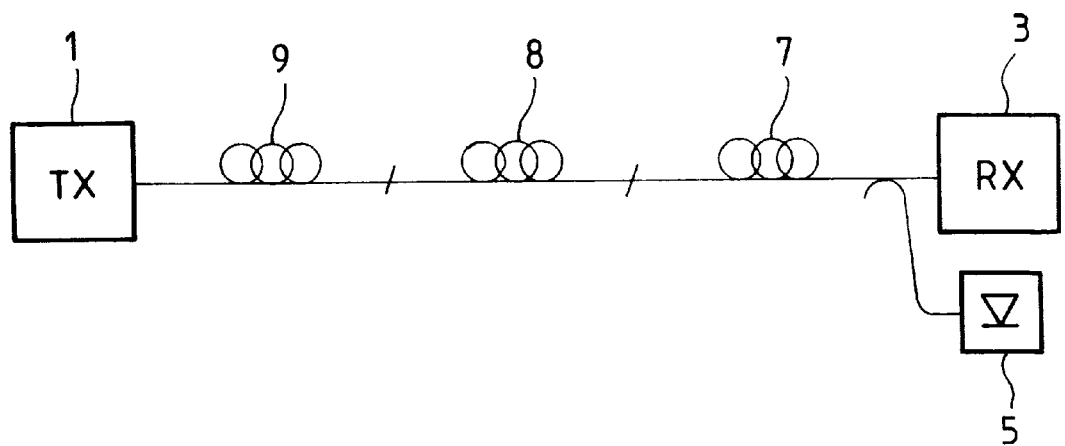

LIMITATION OF OSCILLATION CAUSED BY RAMAN AMPLIFICATION DUE TO THE USE OF DIFFERENT FIBERS

BACKGROUND OF THE INVENTION

1. Field of the invention

The present invention relates to the field of fiber optic transmission and in particular to repeaterless transmission systems. It relates in particular to wavelength division multiplex (WDM) fiber optic transmission systems.

2. Description of the Prior Art

Optical amplifiers, and in particular erbium doped optical fiber amplifiers, are provided at regular intervals along one prior art system of transmitting signals in optical fibers. A solution of this kind is described in Bergano, "Long haul WDM transmission using optimum channel modulation: 32×5 Gbit/s 9 300 km demonstration", OFC'97 post deadline 16, for example. The transmission distances in a system of the above kind are limited by the signal to noise ratio and in particular by amplified spontaneous emission (ASE) generated in the amplifiers.

The article by Morten Nissov et al, "100 Gb/s (10×10 Gb/s) WDM transmission over 7 200 km using distribution Raman amplification", OFC'97, post deadline paper, proposes the use in a transmission system of only distributed stimulated Raman scattering (SRS) amplification to amplify the signal at regular intervals. This solution improves the signal to noise ratio by about 2 dB compared to a comparable solution using only discrete pumps. A description of the Raman effect is given in "Nonlinear Fibre Optics" by G. P. Agrawal, Academic Press, 1980.

P. B. Hansen et al, in "Rayleigh scattering limitations in distributed Raman pre-amplifiers", OFC'97 Technical digest, FA2, indicate that Rayleigh backscattering can constitute a limitation on the use of Raman amplification in transmission systems; the article compares the limitations imposed in dispersion shift fibers (DSF) and silica core fibers (SCF). A 1.1 W contra-propagation pump is used for the Raman pre-amplification. The document raises the problem of the limitation that Rayleigh backscattering can impose on Raman amplification but does not propose any solution to the problem.

The invention proposes a simple and effective solution to the problem. It overcomes the limitation on Raman amplification imposed by Rayleigh backscattering.

SUMMARY OF THE INVENTION

To be more precise, the invention proposes a fiber optic transmission system comprising line fiber and pumping means for distributed amplification in the line fiber by stimulated Raman scattering, wherein the line fiber comprises a plurality of sections and the nature of the fibers in each section and the length of each section are chosen so that the Raman gain is lower than the Rayleigh backscattering coefficient at all points of the system.

In one embodiment the pumping means emit a contra-propagating pump signal.

In another embodiment the pumping means emit a co-propagating pump signal.

The fiber section adjacent the pumping means preferably comprises a fiber with a high effective area.

In another embodiment the fiber section adjacent the section of high effective area comprises dispersion shifted fiber.

Other features and advantages of the invention will become apparent on reading the following description of embodiments of the invention, which description is given by way of example only and with reference to the accompanying drawings.

BRIEF DESCRIPTION OF THE DRAWINGS

The single FIGURE of the accompanying drawings is a schematic representation of a transmission system according to the invention.

DETAILED DESCRIPTION OF THE PREFERRED EMBODIMENT

The invention proposes to overcome the limitation caused by Rayleigh backscattering by using different fibers in a transmission system; the limitation is due to the fact that oscillations can occur if the Raman gain is greater than the Rayleigh backscattering coefficient of the fiber. The invention therefore proposes to adapt the nature of the fibers according to the Raman gain and therefore according to the pump power so that as far as possible the Raman gain remains below the Rayleigh backscattering coefficient.

The figure is a diagrammatic representation of a transmission system according to the invention. The system shown in Figure is a repeaterless fiber optic transmission system using pre-amplification by the Raman effect. The figure shows a transmitter TX 1, a receiver RX 3 and a pump 5 at the same end of the system as the receiver. The pump injects contra-propagating signals into the line fiber to procure amplification by stimulated Raman scattering.

As shown in the figure, the line fiber between the transmitter and the receiver is made up of a plurality of fiber sections. The section 7 nearest the receiver, which is that in which the signal from the pump 5 has the highest intensity, is chosen to prevent oscillation. A fiber can be used for this section which has a large effective area to reduce the Rayleigh backscattering coefficient and thereby prevent oscillation. By "large effective area" is meant an effective area of not less than 70 $\mu m^2$.

In the next section 8 the power of the signal from the pump 5 is lower and a fiber having a smaller effective area and a high Raman gain can therefore be used. Dispersion shifted fiber (DSF) can be used.

After the section 8, the lineifiber terminating at the transmitter is formed of a third section 9. In this section the power of the signal from the pump is virtually negligible and there is virtually no amplification. There is therefore no oscillation in this fiber section either.

The length and the nature of the various sections can be adapted in accordance with the Rayleigh backscaffering as follows. For a given pump power a fiber is chosen for the first section which has an effective area and/or a chemical composition such that the Raman gain is less than the Rayleigh backscaffering coefficient. The Raman gain can be calculated by the approximate method described in A. R. Chraplyvy, "Optical power limits in multi-channel wavelength division multiplexed systems due to Stimulated Raman Scattering", Electronics Letters, vol. 20, n° 2 (1984), pp. 58–59, for example.

The Rayleigh backscattering coefficient is calculated for a fiber as explained in "On the theory of backscattering in single mode optical fiber", Arthur H. Hartog et al, Journal of Lightwave Technology, vol. LT-2, April 1984.

The length of the fiber for the first section is then chosen according to the power from the pump to be injected into the second section. To use a particular fiber in the second section, the length of the first section is varied to adjust the power from the pump which is injected into the second section. It is therefore possible to ensure that the Raman gain in the second section is less than the Rayleigh backscattering coefficient and thereby prevent oscillation.

The length of the second section can then be determined according to the residual pump power to be injected into the third section. In the example shown in the figure the pump power injected into the third section is substantially zero.

The Rayleigh backscattering coefficient, the power of the pump and the Raman gain for each section can be calculated in a manner that is known in the art. The skilled person is therefore easily able to verify the result of using the invention, namely the prevention of oscillation due to Rayleigh backscattering in all the sections.

The embodiment of the invention shown in the figure is explained in the context of pre-amplification by the Raman effect, with a contra-propagating pump at the end of the link. The invention applies also to systems in which the pump is a co-propagating pump, i.e. systems with post-amplification.

The invention has been described in relation to a repeaterless fiber optic transmission system. However, it also applies to transmission systems including repeaters in which distributed amplification by the Raman effect is employed. The invention can be used in the same manner in this case by providing different sections of line fiber between the repeaters.

The invention is described in a situation in which the transmission system includes three fiber sections. It applies to different numbers of sections, depending on the required configuration. The description also refers to the example of a DSF, which has a high Raman gain coefficient and a small effective area. These characteristics favor in-line Raman amplification. However, a different type of fiber can be used for the section 8, also having a Raman coefficient, for example a standard G652 type fiber. The Raman coefficient of a fiber of this kind is higher than that of pure silica core fiber (PSCF).

What is claimed is:

1. A fiber optic transmission system comprising line fiber and pumping means for distributed amplification in said line fiber by stimulated Raman scattering, wherein said line fiber comprises a plurality of sections and the nature of said in each section and the length of each section are chosen so that the Raman gain is lower than the Rayleigh backscattering coefficient at all points of the system.

2. The system claimed in claim 1 wherein said pumping means emit a contra-propagating pump signal.

3. The system claimed in claim 1 wherein said pumping means emit a co-propagating pump signal.

4. The system claimed in claim 1 wherein the fiber section adjacent said pumping means comprises a fiber with a high effective area.

5. The system claimed in claim 4 wherein the fiber section adjacent said section of high effective area comprises dispersion shifted fiber.

* * * * *

UNITED STATES PATENT AND TRADEMARK OFFICE
CERTIFICATE OF CORRECTION

PATENT NO.    : 6,366,729 B1
DATED         : April 2, 2002
INVENTOR(S)   : Brandon et al.

It is certified that error appears in the above-identified patent and that said Letters Patent is hereby corrected as shown below:

Title page,
Item [*] Notice, delete the phrase "by 0 days" and insert -- by 113 days --

Signed and Sealed this

Twelfth Day of October, 2004

JON W. DUDAS
*Director of the United States Patent and Trademark Office*